(12) United States Patent
Hanrahan (10) Patent No.: US 11,591,911 B2
(45) Date of Patent: Feb. 28, 2023

(54) PRESSURE GAIN FOR COOLING FLOW IN AIRCRAFT ENGINES

(71) Applicant: Raytheon Technologies Corporation, Farmington, CT (US)

(72) Inventor: Paul R. Hanrahan, Sedona, AZ (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/238,793

(22) Filed: Apr. 23, 2021

(65) Prior Publication Data

US 2022/0341327 A1 Oct. 27, 2022

(51) Int. Cl.
F01D 5/08 (2006.01)

(52) U.S. Cl.
CPC ........ *F01D 5/087* (2013.01); *F05D 2260/232* (2013.01)

(58) Field of Classification Search
CPC .......... F01D 5/087; F01D 5/088; F01D 5/081; F01D 5/082; F01D 5/084; F01D 5/085; F01D 11/005; F01D 25/12; F05D 2260/232
See application file for complete search history.

(56) References Cited

U.S. PATENT DOCUMENTS

| | | | |
|---|---|---|---|
| 2,973,938 A | 3/1961 | Alford | |
| 4,469,470 A * | 9/1984 | Geary | F01D 25/12 415/115 |
| 4,541,774 A | 9/1985 | Rieck et al. | |
| 4,882,902 A | 11/1989 | Reigel et al. | |
| 5,339,619 A * | 8/1994 | Antonellis | F01D 5/081 416/220 R |
| 5,984,630 A | 11/1999 | Di Salle et al. | |
| 6,077,034 A | 6/2000 | Tomita et al. | |
| 9,988,936 B2 | 6/2018 | Nasr et al. | |
| 2008/0080969 A1* | 4/2008 | Legare | F01D 5/088 415/170.1 |
| 2016/0215792 A1* | 7/2016 | Hiester | F04D 25/045 |

FOREIGN PATENT DOCUMENTS

| | | |
|---|---|---|
| EP | 3225780 A1 | 10/2017 |
| WO | 2015050680 A1 | 4/2015 |

OTHER PUBLICATIONS

Extended European Search Report for Application No. 22162567.6 dated Sep. 14, 2022, 9 pages.

* cited by examiner

*Primary Examiner* — Courtney D Heinle
*Assistant Examiner* — Ryan C Clark
(74) *Attorney, Agent, or Firm* — Cantor Colburn LLP (57) ABSTRACT

Gas turbine engines and rotor arms thereof are described. The gas turbine engines include a first disk, a second disk, and a rotor arm arranged between and connecting the first disk to the second disk, wherein a cavity is defined at least between the rotor arm and the first disk. The rotor arm includes a radial portion having an inner diameter end and an outer diameter end, an axial portion having a first end and a second end, wherein the first end of the axial portion is connected to the outer diameter end of the radial portion, at least one entrance flow path defined within the radial portion extending from the inner diameter end to the outer diameter end, and at least one exit aperture arranged proximate the second end of the axial portion.

19 Claims, 7 Drawing Sheets

PRESSURE GAIN FOR COOLING FLOW IN AIRCRAFT ENGINES

BACKGROUND

The subject matter disclosed herein generally relates to aircraft engines and, more particularly, to cooling flow and pressure gains thereof for cooling components of aircraft engines.

One type of aircraft engine is a gas turbine engine that include various sections that are subject to high temperatures. Ensuring cooling of such components and sections is a goal of gas turbine engine systems. Cooling of cavities within such engines is important to ensure part life and efficient operation. However, using secondary flows of cooling air from a common source to cool multiple cavities and then recombining such flows in a common sink typically requires metering locations along such flow paths. These metering locations result in pressure drops. The pressure drops can result in insufficient cooling or may require boosted pressure at certain locations to ensure that downstream maintains sufficiently high pressure. As such, losses may be realized.

SUMMARY

According to some embodiments, gas turbine engines are provided. The gas turbine engines include a first disk, a second disk, and a rotor arm arranged between and connecting the first disk to the second disk, wherein a cavity is defined at least between the rotor arm and the first disk. The rotor arm has a radial portion having an inner diameter end and an outer diameter end, an axial portion having a first end and a second end, wherein the first end of the axial portion is connected to the outer diameter end of the radial portion, at least one entrance flow path defined within the radial portion extending from the inner diameter end to the outer diameter end, and at least one exit aperture arranged proximate the second end of the axial portion.

In addition to one or more of the features described above, or as an alternative, further embodiments of the gas turbine engines may include that, during rotation of the rotor arm, cooling flow is caused to flow radially through the at least one entrance flow path to the cavity.

In addition to one or more of the features described above, or as an alternative, further embodiments of the gas turbine engines may include that the at least one entrance flow path has a first cross-sectional area and the at least one exit aperture has a second cross-sectional area, wherein the first cross-sectional area is less than the second cross-sectional area.

In addition to one or more of the features described above, or as an alternative, further embodiments of the gas turbine engines may include that the at least one entrance flow path has a first cross-sectional area and the at least one exit aperture has a second cross-sectional area, wherein the second cross-sectional area is 125%-250% of the second cross-sectional area.

In addition to one or more of the features described above, or as an alternative, further embodiments of the gas turbine engines may include that a primary cooling flow is passed through the engine and wherein the at least one entrance flow path is configured to extract a portion of the primary cooling flow and direct said extracted flow into the cavity.

In addition to one or more of the features described above, or as an alternative, further embodiments of the gas turbine engines may include that the portion of the primary cooling flow that is directed to the cavity is 15-40% of a total flow of the primary cooling flow.

In addition to one or more of the features described above, or as an alternative, further embodiments of the gas turbine engines may include that the first disk and the second disk are part of one of a compressor section and a turbine section of the gas turbine engine.

In addition to one or more of the features described above, or as an alternative, further embodiments of the gas turbine engines may include that the first disk is aft of the second disk along an axis of the gas turbine engine.

In addition to one or more of the features described above, or as an alternative, further embodiments of the gas turbine engines may include that the axial portion of the rotor arm is angled radially outward in a direction from the first end to the second end.

In addition to one or more of the features described above, or as an alternative, further embodiments of the gas turbine engines may include that the at least one entrance flow path is defined by a plurality of slots formed in the rotor arm and the at least one exit flow aperture is a hole formed in the rotor arm.

In addition to one or more of the features described above, or as an alternative, further embodiments of the gas turbine engines may include that the first disk is configured to be rotationally driven by a shaft to rotationally drive rotation of the rotor arm and the second disk.

In addition to one or more of the features described above, or as an alternative, further embodiments of the gas turbine engines may include that the at least one entrance flow path is positioned upstream relative to the at least one exit flow aperture with respect to a direction of flow through the cavity.

In addition to one or more of the features described above, or as an alternative, further embodiments of the gas turbine engines may include that the at least one entrance flow path is circumferentially aligned with the at least one exit flow aperture about a circumference of the rotor arm.

In addition to one or more of the features described above, or as an alternative, further embodiments of the gas turbine engines may include that the at least one entrance flow path is a plurality of entrance flow paths and the at least one exit flow aperture is a plurality of exit flow apertures, and wherein the number of entrance flow paths equals the number of exit flow apertures.

According to some embodiments, rotor arms of gas turbine engines are provided. The rotor arms include a radial portion having an inner diameter end and an outer diameter end, an axial portion having a first end and a second end, wherein the first end of the axial portion is connected to the outer diameter end of the radial portion, at least one entrance flow path defined within the radial portion extending from the inner diameter end to the outer diameter end, and at least one exit aperture arranged proximate the second end of the axial portion.

In addition to one or more of the features described above, or as an alternative, further embodiments of the rotor arms may include that at least one of the outer diameter end of the radial portion and the first end of the axial portion are configured to attach to a first disk and the second end of the axial portion is configured to attach to a second disk.

In addition to one or more of the features described above, or as an alternative, further embodiments of the rotor arms may include that the at least one entrance flow path has a first cross-sectional area and the at least one exit aperture has a second cross-sectional area, wherein the first cross-sectional area is less than the second cross-sectional area.

In addition to one or more of the features described above, or as an alternative, further embodiments of the rotor arms may include that the at least one entrance flow path has a first cross-sectional area and the at least one exit aperture has a second cross-sectional area, wherein the second cross-sectional area is 125%-250% of the second cross-sectional area.

In addition to one or more of the features described above, or as an alternative, further embodiments of the rotor arms may include that the at least one entrance flow path is circumferentially aligned with the at least one exit flow aperture about a circumference of the rotor arm.

In addition to one or more of the features described above, or as an alternative, further embodiments of the rotor arms may include that the at least one entrance flow path is a plurality of entrance flow paths and the at least one exit flow aperture is a plurality of exit flow apertures, and wherein the number of entrance flow paths equals the number of exit flow apertures.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
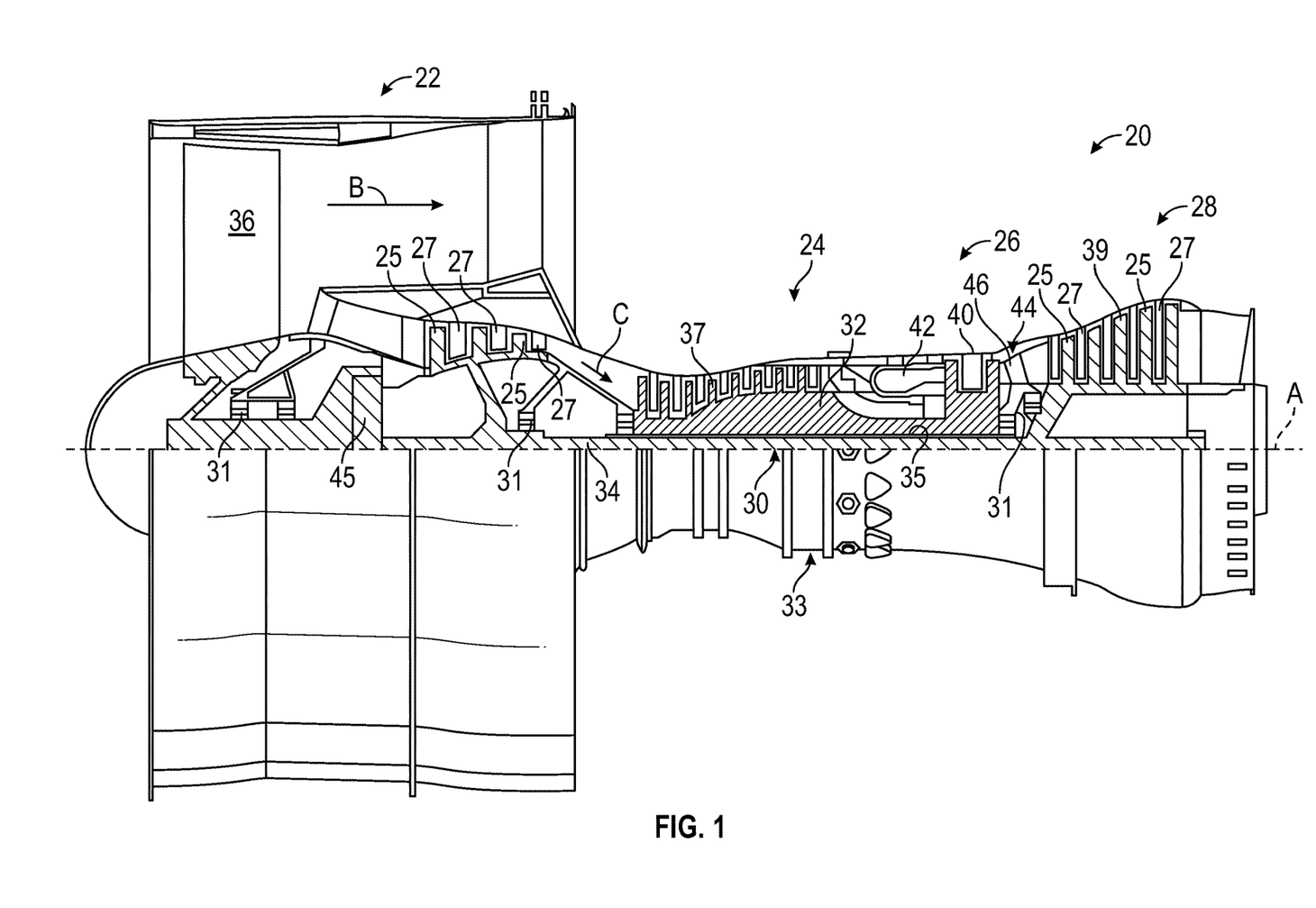
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded over the high-pressure turbine 40 and the low-pressure turbine 39. The high-pressure turbine 40 and the low-pressure turbine 39 rotationally drive the respective high-speed spool 32 and the low-speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration. For example, the teachings provided herein may be applied to other types of engines. Some such example alternative engines may include, without limitation, turbojets, turboshafts, and other turbofan configurations (e.g., wherein an intermediate spool includes an intermediate pressure compressor ("IPC") between a low-pressure compressor ("LPC") and a high-pressure compressor ("HPC"), and an intermediate pressure turbine ("IPT") between the high-pressure turbine ("HPT") and the low-pressure turbine ("LPT")).

Figure 2:
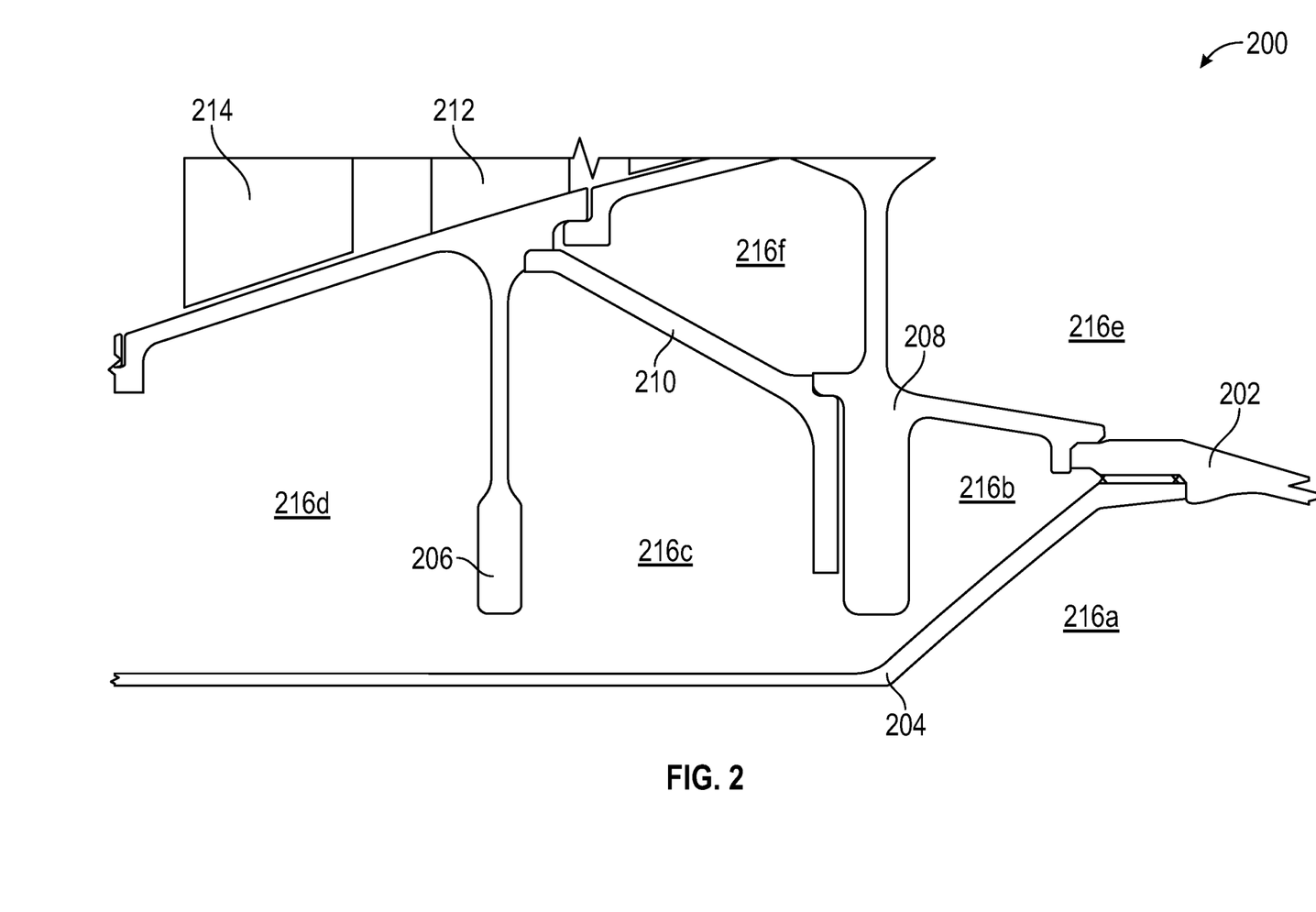
FIG. 2 is a schematic illustration of a portion of a gas turbine engine that may incorporate embodiments of the present disclosure.

Turning now to FIG. 2, a schematic illustration of a portion of a gas turbine engine 200 is shown. The illustration shown in FIG. 2 shows a portion of a compressor section, such as a high pressure compressor. It will be appreciated that the illustration of FIG. 2 may also represent a portion of a low pressure compressor, high pressure turbine, low pressure turbine, or other section of an aircraft engine, without departing from the scope of the present disclosure. The gas turbine engine 200 includes a rotor shaft 202, a tie shaft 204, a first disk 206, a second disk 208, and a rotor arm 210 connecting the first disk 206 and the second disk 208. The rotor shaft 202 and the tie shaft 204 are configured to be rotationally driven by a turbine section (not shown) of the gas turbine engine 200.

The first disk 206 include one or more blades 212 connected thereto. It will be appreciated that the blades 212 may be fixedly attached or integrally formed with the first disk 206. The second disk 208 may also include one or more blades (not shown), as will be appreciated by those of skill in the art. As shown, in this embodiment, the second disk 208 is operably coupled to the rotor shaft 202, and thus the second disk 208 may be rotationally driven by the rotor shaft 202. The first disk 206 is coupled to the second disk 208 by the rotor arm 210 such that the first disk 206 may be rotationally driven by the second disk 208. It will be appreciated that other connection mechanisms and arrangements may be possible. For example, the first disk 206 may be coupled to one or more of the shafts of the gas turbine engine to be rotationally driven thereby. Each of the disks 206, 208 may include blades 212 that are rotationally driven by the respective disks 206, 208. The blades 212 may be arranged relative to vanes 214, as will be appreciated by those of skill in the art.

Cooling may be provided throughout the gas turbine engine 200 to cool components thereof. For example, it may be desirable to cool cavities of the gas turbine engine 200. As shown, the gas turbine engine 200, in FIG. 2, forms a plurality of cavities 216a-f. The cavities 216a-f are defined between components of the gas turbine engine 200. Certain cavities (e.g., cavity 216e) may be relatively isolated due to structures within the gas turbine engine 200. As shown, one cavity 216e is bounded by the second disk 208 and the rotor arm 210 (and, potentially, a portion of the first disk 206). As such, providing cooling air therein may be difficult. Further, if air is supplied into such cavity 216e, removing the air from the cavity 216e and forming a cooling flow therethrough may also be difficult.

Figure 3A:
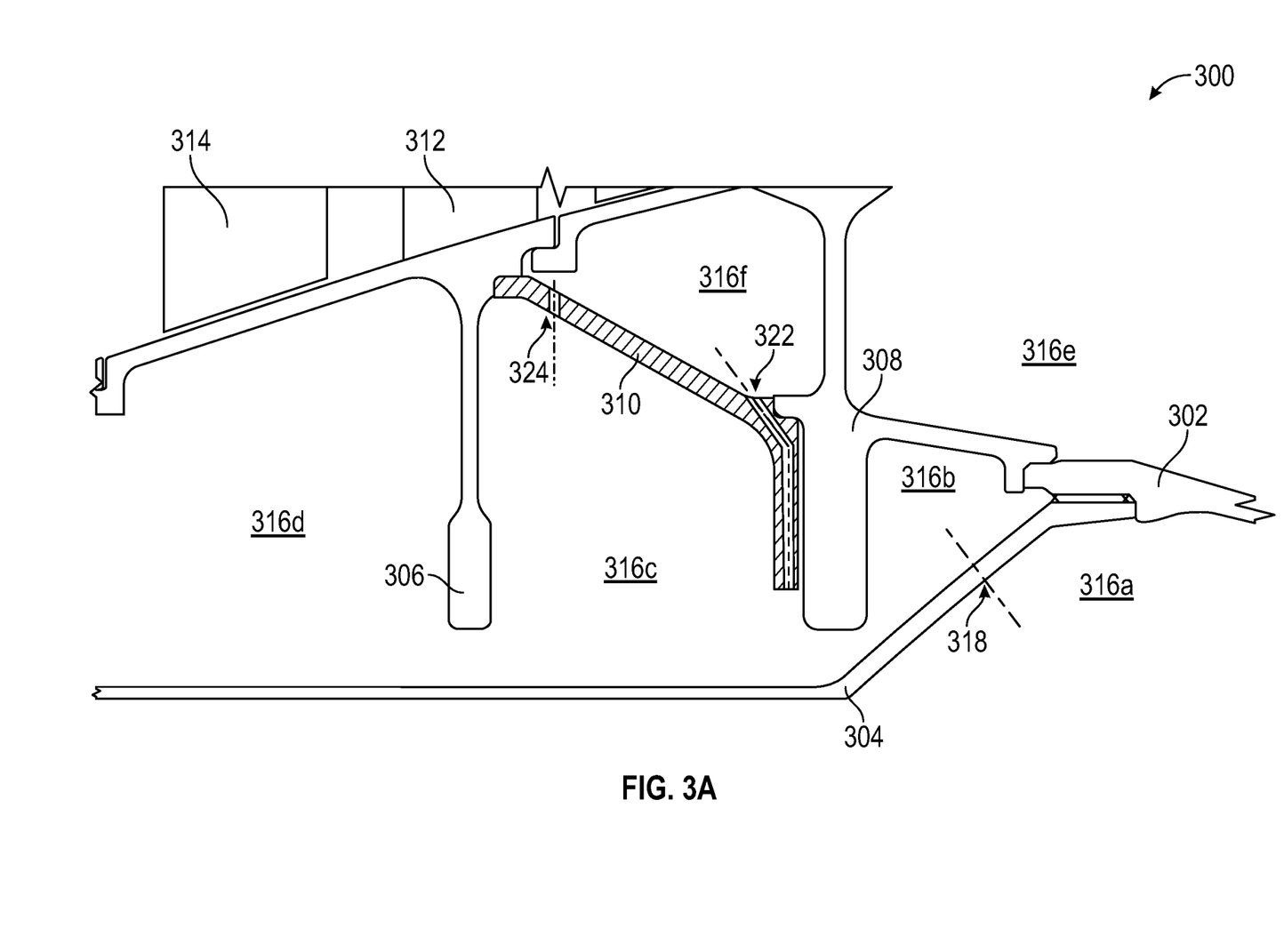
FIG. 3A is a schematic illustration of a portion of a gas turbine engine having a rotor arm in accordance with an embodiment of the present disclosure.
Figure 3B:
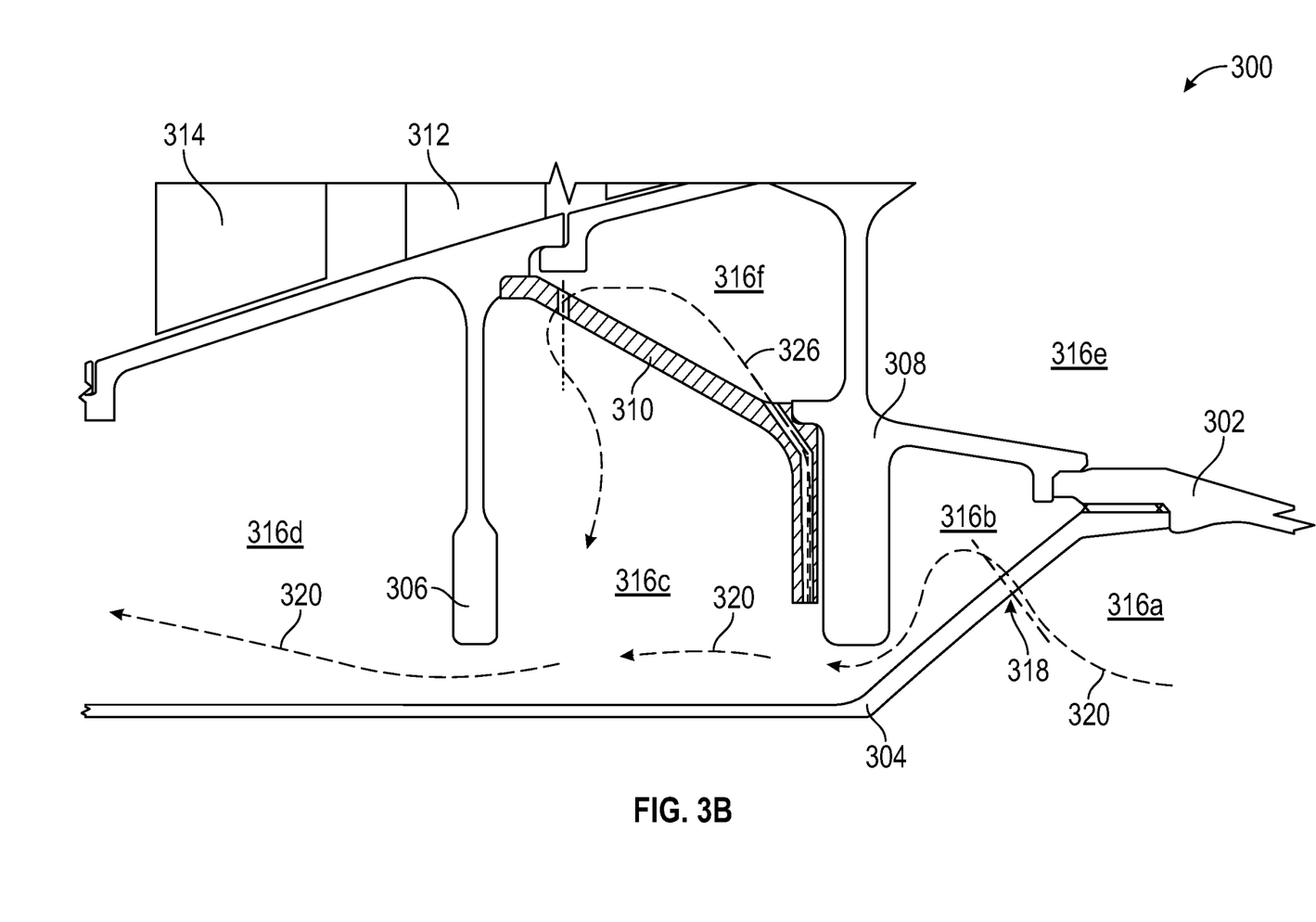
FIG. 3B is a schematic illustration showing an airflow path through components of the gas turbine engine shown in FIG. 3A.

Turning now to FIGS. 3A-3B, schematic illustrations of a portion of a gas turbine engine 300 are shown. The illustrations shown in FIGS. 3A-3B show a portion of a compressor section, such as a high pressure compressor. It will be appreciated that the illustrations of FIGS. 3A-3B may also represent a portion of a low pressure compressor, high pressure turbine, low pressure turbine, or other section of an aircraft engine, without departing from the scope of the present disclosure. The gas turbine engine 300 includes a rotor shaft 302, a tie shaft 304, a first disk 306, a second disk 308, and a rotor arm 310 connecting the first disk 306 and the second disk 308. The rotor shaft 302 and the tie shaft 304 are configured to be rotationally driven by a turbine section (not shown) of the gas turbine engine 300. Similar to that shown and described above, the first disk 306 and second disk 308 may include one or more blades 312 arranged between vanes 314 of the gas turbine engine 300.

To enable a cooling of components of the gas turbine engine 300, one or more flow apertures may be formed in various components of the gas turbine engine 300 to form a cooling flow path. For example, the tie shaft 304 can include a flow aperture 318 configured to enable fluid flow (e.g., cooling air) from a first cavity 316a to a second cavity 316b, which in turn will flow axially forward (to the left in FIG. 3A) to a third cavity 316c and a fourth cavity 316d. In this configuration and description, the cooling flow is a forward flowing cooling flow (i.e., from aft to forward of the engine along an engine axis). A fifth cavity 316e may be supplied from other flow paths or cooling schemes, as will be appreciated by those of skill in the art.

A primary cooling flow 320 is shown in FIG. 3B.

The flow aperture 318, being significantly smaller in area than the cavities it connects, retards the cooling flow by causing a pressure drop therethrough. This pressure drop dictates that the second cavity 316b must operate at a lower pressure than the first cavity 316a, while serving to prevent or minimize any backflow from the second cavity 316b to the first cavity 316a. It then follows that the cooling flow feeding the first cavity 316a must come from a higher-pressure source than the sink to which the flow is routed (i.e., second, third, and fourth cavities 316b, 316c, 316d). It is noted that because the second, third, and fourth cavities 316b, 316c, 316d do not have any flow-retarding aperture(s) between them, the difference in operating pressures between these three cavities may be negligible.

However, a sixth cavity 316f in this embodiment, may be remote from any convenient or potential aperture(s) that could connect it from and to two cavities of different pressure, which would deprive it of cooling flow. As shown, the sixth cavity 316f is bounded by the first disk 306, the second disk 308, and the rotor arm 310. To provide a cooling flow to the sixth cavity 316f, a cooling flow source is required. In this illustrative configuration, the preferred source for cooling flow is the primary cooling flow 320. Splitting a portion of the primary cooling flow 320 to cool the sixth cavity 316f may result in pressure drops that can be detrimental for overall cooling effectiveness. For example, splitting secondary flow from a common source (primary cooling flow 320) to cool multiple cavities (sixth cavity 316O and then recombining in a common sink (back to primary cooling flow 320 in second cavity 316b) typically involves metering locations in each leg and measurable pressure drop. This pressure drop and/or change in pressure can detrimental to the achievable flow of the system. The desired flow direction through the sixth cavity 316f shown in FIG. 3B may not be achievable with metering apertures because the source and sink pressures (third cavity 316c) are the same/common.

Accordingly, embodiments of the present disclosure are directed to a cooling flow scheme that enables relatively low pressure cooling flow from the primary cooling flow 320 to be diverted into the sixth cavity 316f from the third cavity 316c and then causing the flow to pass through the sixth cavity 316f and back into the third cavity 316c to be recombined with the primary cooling flow 320, as shown in FIG. 3B. To achieve this, an entrance flow path 322 and an exit flow aperture 324 may be formed in the structure of the rotor arm 310 to ensure a secondary cooling flow 326 to be generated and supply cool air into the sixth cavity 316f. Thus, the air in the sixth cavity 316f will have a higher pressure than the air in the cooling flow source cavity (e.g., third cavity 316c). As such, the cooling flow will require assistance to be directed radially outward and then a solution for having the cooling flow recombine with the primary cooling flow 320 is required.

In accordance with embodiments of the present disclosure, the rotor arm 310 is modified to define or form a pressure gain feature. As the rotor arm 310 is rotated, the rotor arm 310 and radially distending the features of the entrance flow path 322 will operate as a centrifugal pump to increase the pressure of the air traversing through the entrance flow path 322 by raising the angular momentum of the air as it moves outboard through the rotating passages, as described herein. This high pressure air will then cool within the sixth cavity 316f. The cooling air will then exit the sixth cavity 316f through the exit flow aperture 324 due to the air pressure being relatively high within the sixth cavity 316f as compared to the pressure within the third cavity 316c, in which the air will rejoin the primary cooling flow 320. This flow path is referred to as the secondary cooling flow 326 and is illustratively shown in FIG. 3B. The result is a leg of the split primary cooling flow 320 is routed through a pressure gain feature such as slot(s) in a rotating flange joint or tube(s) attached to the rotor arm 310 to flow from radially inward to radially outward. This will centrifugally pump up the pressure of the air so that it can flow through the sixth cavity 316f and be recombined with the primary cooling flow 320 at or near their common source pressure within the third cavity 316c.

The features of each of the entrance flow path(s) 322 and the exit flow aperture(s) 324 may be formed within the material of the rotor arm 310. For example, the channels, apertures, holes, slots, and other flow path features may be machined, cast, or otherwise formed within the rotor arm 310 during or after manufacture of the rotor arm 310. In some configurations, the entrance flow path 322 may be formed by one or more flow channels or flow slots. Multiple entrance flow paths 322 and exit flow apertures 324 may be formed at different circumferential positions about the rotor arm 310 to provide cooling about an entire circumference (at a given radial position) of the gas turbine engine 300. The number, shape, size, and length of the entrance flow paths 322 and exit flow apertures 324 may be selected to achieve a desired cooling of the sixth cavity 316f and the material of the components that define such sixth cavity 316f.

Figure 4:
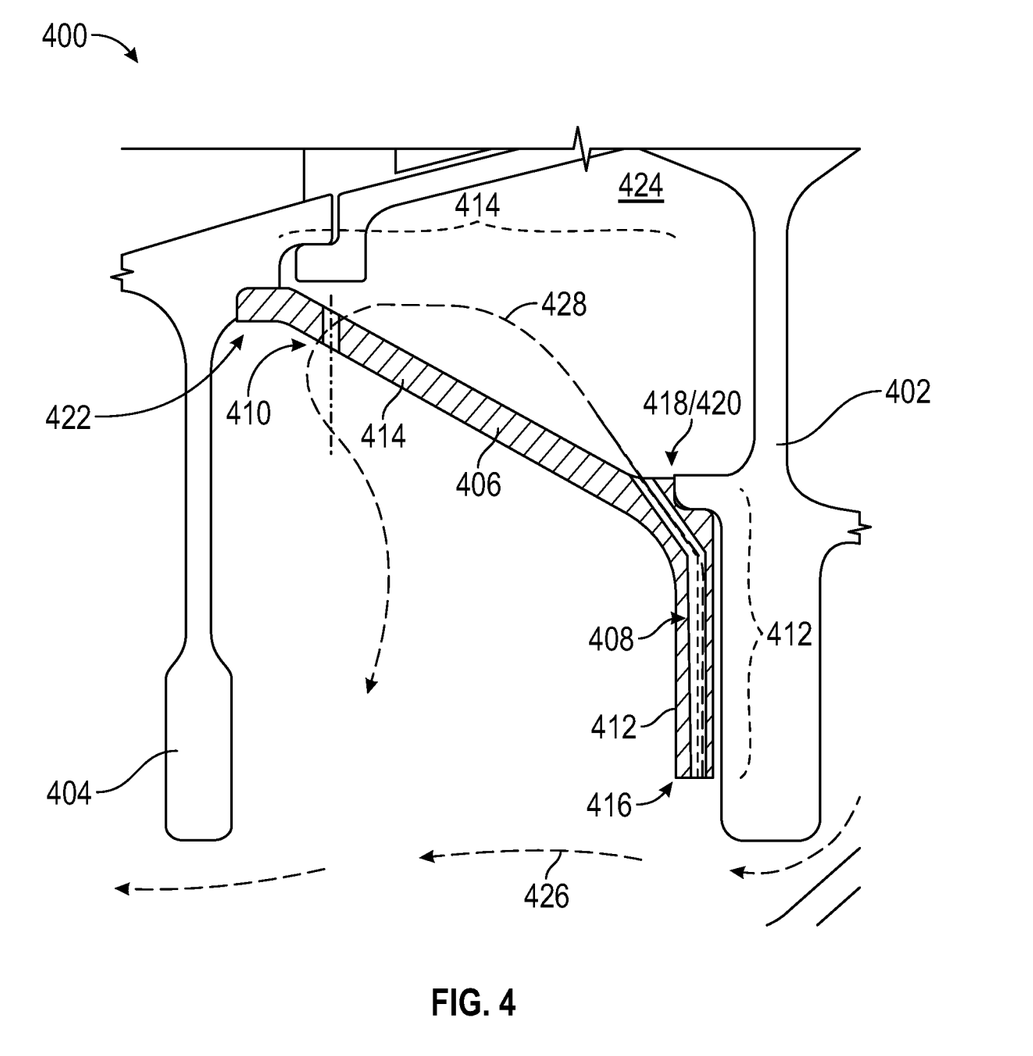
FIG. 4 is a schematic illustration of a portion of a gas turbine engine having a rotor arm in accordance with an embodiment of the present disclosure.

Turning now to FIG. 4, a schematic illustration of a portion of a gas turbine engine 400 is shown. The illustration shown in FIG. 4 is an enlarged illustration having a configuration substantially similar to that shown and described with respect to FIGS. 3A-3B, and thus description of similar features may be omitted herein. The illustration of FIG. 4 illustrates a first disk 402, a second disk 404, and a rotor arm 406 connecting the first disk 402 and the second disk 404.

The rotor arm 406 includes one or more entrance flow paths 408 and one or more exit flow apertures 410, as described herein. The entrance flow paths 408 are radial flow paths that extend substantially radially through a portion of the rotor arm 406. For example, as shown, the rotor arm 406 includes a radial portion 412 and an axial portion 414. In this configuration, the radial portion 412 is at an aft end of the rotor arm 406, when installed in the gas turbine engine 400 and connects to the first disk 402. The axial portion 414, in this embodiment, extends axially forward from the axial portion 412 to connect with the second disk 404. The radial portion 412 extends radially from an inner diameter end 416 to an outer diameter end 418. As shown, the axial portion 414 does not extend parallel to an engine axis but rather is angled radially outward from a first end 420 to a second end 422. In this embodiment, the first end 420 is aft of the second end 422. The outer diameter end 418 of the radial portion 412 joins with or defines the intersection with the first end 420 of the axial portion 414.

In operation without a pressure gain device, the air pressure at the inner diameter end 416 is not greater than the air pressure at the outer diameter end 418. As such, without aid, the cooling flow will not travel outboard. However, an outboard radial air flow in slots (or holes) through the entrance flow paths 408 increases total pressure, with such entrance flow paths 408 operating like a centrifugal compressor stage, by raising angular momentum. This causes the air at the inner diameter end 416 to flow through the entrance flow paths 408 to a cavity 424. The geometry, number, and length of the entrance flow paths 408 combined with the rotation of the rotor arm 406 causes a pressure differential to operate as a centrifugal pump to direct a portion of a primary cooling flow 426 into a secondary cooling flow 428 and into the cavity 424.

The air within the cavity 424 will then exit the cavity 424 through one or more exit flow apertures 410. The flow exits the cavity 424 through the exit flow apertures 410 which is driven by a pressure differential created in the exit flow apertures. That is, a relatively high pressure in cavity 424 and relatively low pressure along the primary cooling flow 426 causes the air within the cavity 424 to flow through the exit flow apertures 410 back to the primary cooling flow 426. The exit flow apertures 410 may be sized larger than the inlet slots or holes of the entrance flow path 408 (e.g., 125%-250% of inlet slot area) to not significantly restrict the flow, while achieving high enough velocity to prevent reverse flow.

Figure 5A:
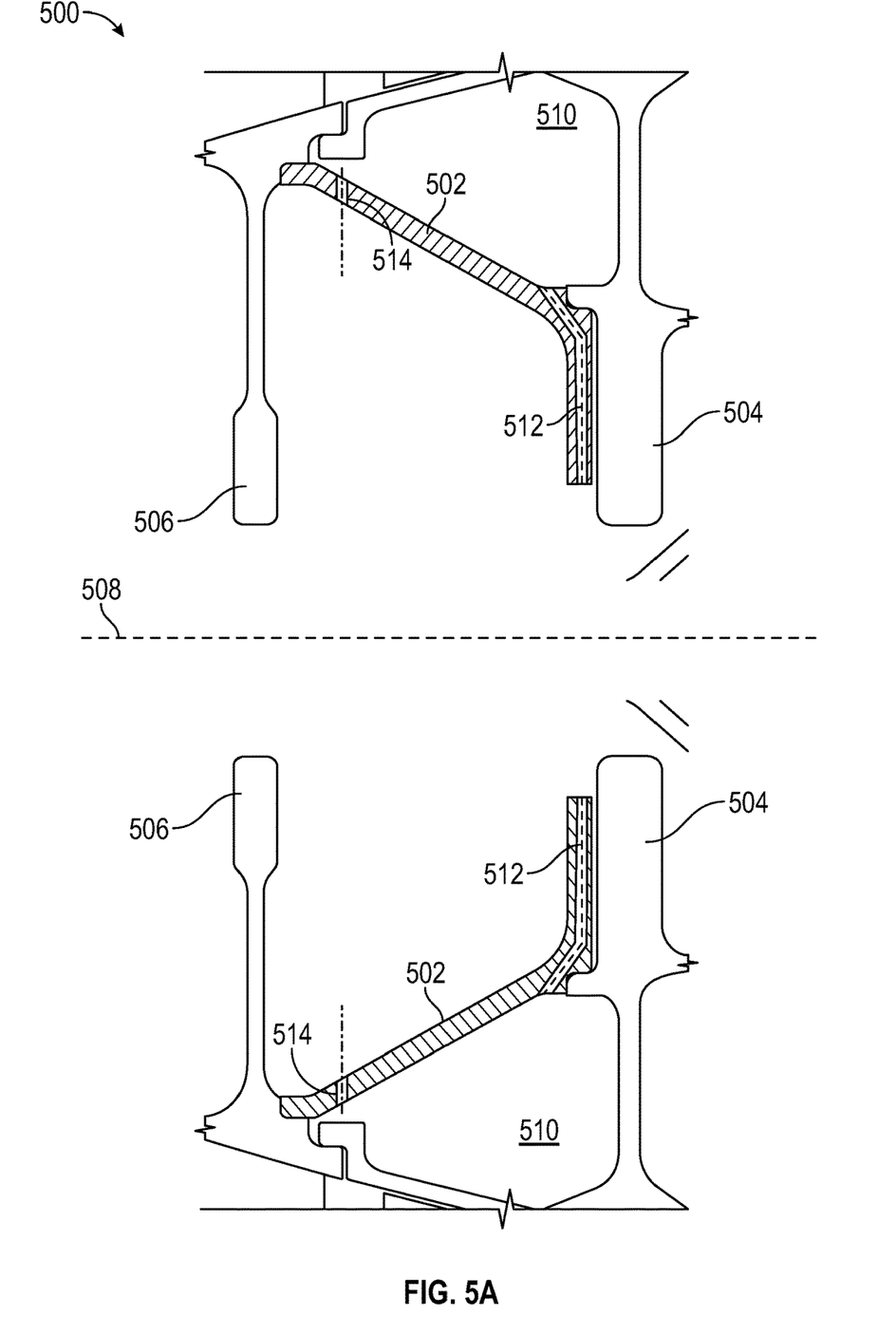
FIG. 5A is a schematic illustration of a portion of a gas turbine engine having a rotor arm in accordance with an embodiment of the present disclosure.
Figure 5B:
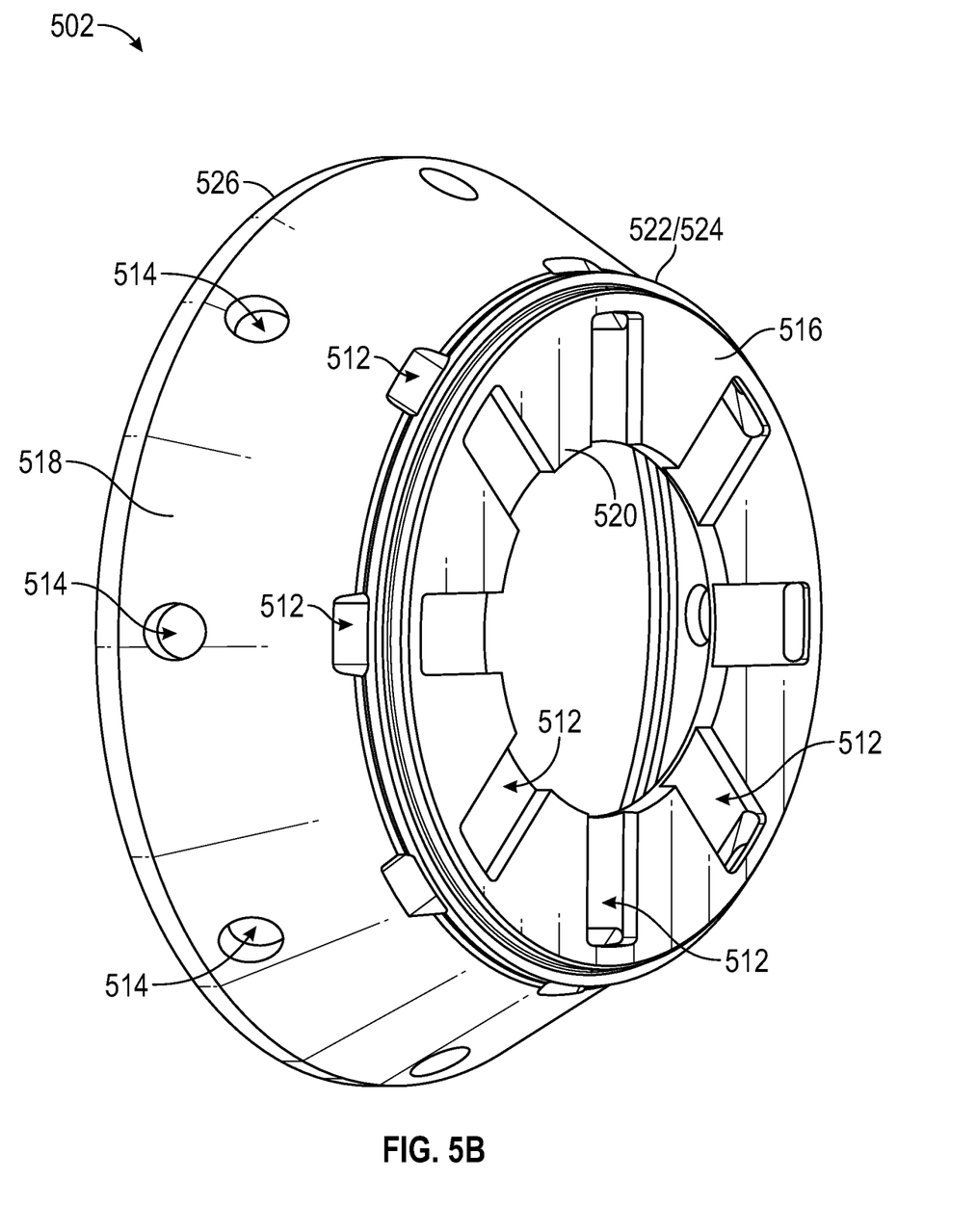
FIG. 5B is a schematic illustration of a rotor arm employed in the configuration shown in FIG. 5A.

Turning now to FIGS. 5A-5B, schematic illustrations of a portion of a gas turbine engine 500 having a rotor arm 502 in accordance with an embodiment of the present disclosure are shown. FIG. 5A illustrates the rotor arm 502 as installed in the gas turbine engine 500 and FIG. 5B illustrates a perspective illustration of the rotor arm 502. The gas turbine engine of FIG. 5A is an enlarged illustration having a configuration substantially similar to that shown and described above, and thus description of similar features may be omitted herein. The gas turbine engine 500 includes a first disk 504, a second disk 506, and the rotor arm 502 connecting the first disk 504 and the second disk 506.

The components 502, 504, 506 of the gas turbine engine 500 are annular or circumferential structures arranged about an engine axis 508. The components 502, 504, 506 may be rotationally driven by one or more shafts, as will be appreciated by those of skill in the art. The rotor arm 502 has a substantially conical or annular shape, as shown in FIG. 5B. The rotor arm 502, when installed between and connecting the first disk 504 and the second disk 506, defines a cavity 510 which may require cooling air during operation. The rotor arm 502 thus include one or more entrance flow paths 512 to supply cooling air into the cavity 510 and one or more exit flow apertures 514 to expel such air back to a primary cooling flow, as described above.

As shown in FIG. 5B, the rotor arm 502 has a radial portion 516 and an axial portion 518. The radial portion 516 extends substantially radially from an inner diameter end 520 to an outer diameter end 522 of the radial portion 516. The radial portion 516 joins with or connects to the axial portion 518 at the outer diameter end 522. The axial portion 518 extends from the radial portion 516 at a first end 524 to a second end 526. In this embodiment, the first end 524 is aft of the second end 526, although the opposite may be true for other engine configurations and depending on a direction of a primary cooling flow. The entrance flow paths 512 are formed within and define channels within the radial portion 516 and have apertures or openings formed in the axial portion 518 at the first end of the axial portion 518. The exit flow apertures 514 are arranged proximate the second end 526 of the axial portion 518.

The axial flow path portion of the entrance flow paths 512 may be defined by conduits, channels, or slots. The cross-sectional area (in a flow direction through the feature) of such entrance flow paths 512 may be selected to ensure a desired air flow and/or pressure differential to be generated during rotation of the rotor arm 518 within the gas turbine engine 500. At a component level, for example and in accordance with some embodiments, the size and shape of the entrance flow paths 512 may be selected such that between 15%-40% of a primary cooling flow may be extracted and conveyed into the cavity 510. The exit flow apertures 514 may be selected to be larger in cross-sectional area (in a flow direction through the feature) than the cross-sectional area of the entrance flow paths 512. For example, in some non-limiting embodiments, the cross-sectional area of the exit flow apertures 514 may be 125%-250% larger than the cross-sectional area of the entrance flow paths 512.

Although shown and described with a forward-flowing cooling flow (with the first disk aft of the second disk), it will be appreciated that embodiments of the present disclosure will operate similarly to an aft-flowing cooling flow. Embodiments of the present disclosure are directed to a component that in-part defines a remote cavity to incorporate flow passages that operate as a pump during rotation to direct relatively cool (and initially relatively low pressure) air into a remote cavity at higher pressure. This is achieved through the entrance flow paths having channels or passages that, when rotated, operate as a centrifugal pump to increase the pressure of the air within the passage and thus cause such air to flow outboard into the cavity. Once in the cavity, exit flow apertures provide a low pressure differential path for the flow to rejoin the primary cooling flow.

Advantageously, embodiments described herein provide for improved mechanisms for cooling cavities within gas turbine engines. Specifically, for example, embodiments of the present disclosure may provide for cooling of otherwise dead air cavities without adding pressure drops within the system. Further, advantageously, embodiments of the present disclosure can result in a net-zero pressure change even while cooling a previously "dead air" cavity. By increasing the angular velocity of the air, the pressure increases, this can result in cooling airflow that flows outboard despite coming from a lower inboard source pressure. By having a radial span within and along the entrance flow paths the work done on the air increases due to increased angular momentum at the greater radial positions. This causes the air to flow into the cavity, and then the air can exit such cavity through one or more exit flow apertures.

Advantageously, embodiments of the present disclosure provide for a purging flow that is extracted from and a portion of a primary cooling flow within a gas turbine engine. The purging flow will flow through the entrance flow paths due to the angular momentum increase at larger radial distances. The air will enter the cavity and purge through the exit flow apertures to rejoin the primary cooling flow with negligible net pressure drop. The size and number of entrance flow paths may be selected to meter the flow to a portion or fraction of the total available primary cooling flow. The size and number of entrance flow paths may be selected to ensure that the main flow does not reference into a feedback loop. To achieve this, in accordance with some embodiments, the size and number of entrance flow paths may be selected to extract between 15%-40% of the total airflow of the primary cooling flow at the location of the entrance flow paths. Similarly, the size and number of exit apertures may be selected to not significantly restrict the flow while achieving high enough velocity to prevent reverse flow therethrough.

It will be appreciated that in some embodiments of the present disclosure, the number of entrance flow paths and the number of exit flow apertures may be the same. However, in other embodiments, the number of entrance flow paths may exceed the number of exit flow apertures. In other embodiments, the number of entrance flow paths may be less than the number of exit flow apertures. As such, the specific number and relationship of number of features relative to each other is not to be limiting and may be selected to achieve a desired flow through a remote cavity, as described herein. Further, although illustratively shown with the entrance flow paths and the exit flow apertures being aligned in a circumferential direction, such arrangement is not to be limiting. For example, in some embodiments, the position of the exit flow apertures may be offset in a circumferential direction from the locations of the entrance flow paths on the rotor arm. Accordingly, the above description and accompanying illustrations are provided to be illustrative and for explanatory purposes only, and are not intended to be limiting to the specific configurations and embodiments described herein.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A gas turbine engine comprising:
    a first disk;
    a second disk, wherein the first disk is aft of the second disk along an axis of the gas turbine engine; and
    a rotor arm arranged between and connecting the first disk to the second disk, wherein a cavity is defined at least between the rotor arm and the first disk, the rotor arm having:
        a radial portion having an inner diameter end and an outer diameter end;
        an axial portion having a first end and a second end, wherein the first end of the axial portion is connected to the outer diameter end of the radial portion;
        at least one entrance flow path defined within the radial portion extending from the inner diameter end to the outer diameter end; and
        at least one exit aperture arranged proximate the second end of the axial portion.

2. The gas turbine engine of claim 1, wherein, during rotation of the rotor arm, cooling flow is caused to flow radially through the at least one entrance flow path to the cavity.

3. The gas turbine engine of claim 1, wherein the at least one entrance flow path has a first cross-sectional area and the at least one exit aperture has a second cross-sectional area, wherein the first cross-sectional area is less than the second cross-sectional area.

4. The gas turbine engine of claim 1, wherein the at least one entrance flow path has a first cross-sectional area and the at least one exit aperture has a second cross-sectional area, wherein the second cross-sectional area is 125%-250% of the first cross-sectional area.

5. The gas turbine engine of claim 1, wherein a primary cooling flow is passed through the engine and wherein the at least one entrance flow path is configured to extract a portion of the primary cooling flow and direct said extracted flow into the cavity.

6. The gas turbine engine of claim 5, wherein the portion of the primary cooling flow that is directed to the cavity is 15-40% of a total flow of the primary cooling flow.

7. The gas turbine engine of claim 1, wherein the first disk and the second disk are part of one of a compressor section or a turbine section of the gas turbine engine.

8. A gas turbine engine comprising:
    a first disk;
    a second disk; and
    a rotor arm arranged between and connecting the first disk to the second disk, wherein a cavity is defined at least between the rotor arm and the first disk, the rotor arm having:
        a radial portion having an inner diameter end and an outer diameter end;
        an axial portion having a first end and a second end, wherein the first end of the axial portion is connected to the outer diameter end of the radial portion;
        at least one entrance flow path defined within the radial portion extending from the inner diameter end to the outer diameter end; and
        at least one exit aperture arranged proximate the second end of the axial portion,
    wherein a primary cooling flow is passed through the engine and wherein the at least one entrance flow path is configured to extract a portion of the primary cooling flow and direct said extracted flow into the cavity and wherein the portion of the primary cooling flow that is directed to the cavity is 15-40% of a total flow of the primary cooling flow.

9. The gas turbine engine of claim 1, wherein the axial portion of the rotor arm is angled radially outward in a direction from the first end to the second end.

10. The gas turbine engine of claim 1, wherein the at least one entrance flow path is defined by a plurality of slots formed in the rotor arm and the at least one exit flow aperture is a hole formed in the rotor arm.

11. The gas turbine engine of claim 1, wherein the first disk is configured to be rotationally driven by a shaft to rotationally drive rotation of the rotor arm and the second disk.

12. The gas turbine engine of claim 1, wherein the at least one entrance flow path is positioned upstream relative to the at least one exit flow aperture with respect to a direction of flow through the cavity.

13. The gas turbine engine of claim 1, wherein the at least one entrance flow path is circumferentially aligned with the at least one exit flow aperture about a circumference of the rotor arm.

14. The gas turbine engine of claim 1, wherein the at least one entrance flow path is a plurality of entrance flow paths and the at least one exit flow aperture is a plurality of exit flow apertures, and wherein the number of entrance flow paths equals the number of exit flow apertures.

15. The gas turbine engine of claim 8, wherein the first disk is aft of the second disk along an axis of the gas turbine engine.

16. The gas turbine engine of claim 15, wherein the at least one entrance flow path has a first cross-sectional area and the at least one exit aperture has a second cross-sectional area, wherein the first cross-sectional area is less than the second cross-sectional area.

17. The gas turbine engine of claim 15, wherein the at least one entrance flow path has a first cross-sectional area and the at least one exit aperture has a second cross-sectional area, wherein the second cross-sectional area is 125%-250% of the first cross-sectional area.

18. The gas turbine engine of claim 15, wherein the axial portion of the rotor arm is angled radially outward in a direction from the first end to the second end.

19. The gas turbine engine of claim 15, wherein the at least one entrance flow path is positioned upstream relative to the at least one exit flow aperture with respect to a direction of flow through the cavity.

* * * * *